(12) United States Patent
Ma et al.

(10) Patent No.: US 10,962,810 B2
(45) Date of Patent: Mar. 30, 2021

(54) STRAINED GERMANIUM SILICON OPTICAL MODULATOR ARRAY INCLUDING STRESS MATERIALS

(71) Applicant: Massachusetts Institute of Technology, Cambridge, MA (US)

(72) Inventors: Danhao Ma, Cambridge, MA (US); Yiding Lin, Singapore (SG); Jurgen Michel, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/585,081

(22) Filed: Sep. 27, 2019

(65) Prior Publication Data

US 2020/0103680 A1  Apr. 2, 2020

Related U.S. Application Data

(60) Provisional application No. 62/737,374, filed on Sep. 27, 2018.

(51) Int. Cl.
*G02F 1/025* (2006.01)
*G02F 1/015* (2006.01)
*H04J 14/02* (2006.01)

(52) U.S. Cl.
CPC .......... *G02F 1/025* (2013.01); *G02F 1/0157* (2021.01); *G02F 2201/063* (2013.01);
(Continued)

(58) Field of Classification Search
CPC ............ G02F 1/025; G02F 2001/0157; G02F 2002/101; G02F 2002/102; G02F 2002/105; G02F 2201/063; H02J 14/02
(Continued)

(56) References Cited

U.S. PATENT DOCUMENTS 5,131,060 A * 7/1992 Sakata .................. G02F 1/3133
257/184
5,574,289 A * 11/1996 Aoki ..................... B82Y 20/00
257/17

(Continued)

OTHER PUBLICATIONS

Almeida et al., "All-optical control of light on a silicon chip." Nature 431.7012 (2004): 1081-1084.
(Continued)

*Primary Examiner* — Tina M Wong
(74) *Attorney, Agent, or Firm* — Smith Baluch LLP

(57) ABSTRACT

An integrated optical modulator array useful for modulating light at different wavelengths in the same optical band includes multiple GeSi waveguides on a substrate. Each GeSi waveguide has a different width and is coupled to electrodes to form an electro-absorption modulator. A stressor material, such as SiN, disposed between the GeSi waveguides in the optical modulators applies a strain to the GeSi waveguides. Because each GeSi waveguide has a different width, it experiences a different strain. This difference can be a difference in magnitude, type (homogeneous v. inhomogeneous, compressive v. tensile), or both. The different strains shift the bandgaps of the Ge in the GeSi waveguides by different amounts, shifting the optical absorption edges for the GeSi waveguides by different amounts. Put differently, the stressor layer strains each GeSi modulator differently, causing each GeSi modulator to operate at a different wavelength.

22 Claims, 8 Drawing Sheets

(52) U.S. Cl.
CPC .... *G02F 2202/10* (2013.01); *G02F 2202/101* (2013.01); *G02F 2202/102* (2013.01); *G02F 2202/105* (2013.01); *H04J 14/02* (2013.01)

(58) Field of Classification Search
USPC .......................................................... 385/2
See application file for complete search history.

(56) References Cited

U.S. PATENT DOCUMENTS

| | | | |
|---|---|---|---|
| 6,393,185 B1 | 5/2002 | Deacon | |
| 6,535,653 B1* | 3/2003 | Hung | G02F 1/225 385/2 |
| 9,568,750 B2* | 2/2017 | Spann | H01L 29/20 |
| 2002/0064333 A1* | 5/2002 | Shigeta | H01S 5/02216 385/14 |
| 2004/0090659 A1 | 5/2004 | Zhang et al. | |
| 2004/0264832 A1 | 12/2004 | Kondo et al. | |
| 2005/0141801 A1* | 6/2005 | Gardner | B82Y 20/00 385/2 |
| 2009/0022445 A1 | 1/2009 | Hochberg et al. | |
| 2009/0110342 A1* | 4/2009 | Webster | G02F 1/025 385/2 |
| 2009/0238511 A1* | 9/2009 | Quitoriano | G02F 1/025 385/2 |
| 2011/0142390 A1* | 6/2011 | Feng | G02F 1/025 385/2 |
| 2011/0222813 A1* | 9/2011 | Webster | G02F 1/025 385/3 |
| 2012/0148184 A1* | 6/2012 | Yoneda | G02F 1/01708 385/2 |
| 2013/0071058 A1* | 3/2013 | Lim | G02F 1/025 385/2 |
| 2014/0197375 A1 | 7/2014 | Faist et al. | |
| 2015/0010263 A1* | 1/2015 | Fong | G02B 6/131 385/2 |
| 2015/0249320 A1* | 9/2015 | Clifton | H01S 5/125 372/45.011 |
| 2016/0299362 A1* | 10/2016 | Akiyama | G02F 1/01708 |
| 2017/0131578 A1 | 5/2017 | Fong et al. | |
| 2017/0139239 A1* | 5/2017 | Li | G02F 1/025 |
| 2017/0315292 A1* | 11/2017 | Mullen | G02B 6/1228 |
| 2020/0103680 A1* | 4/2020 | Ma | G02F 1/025 |

OTHER PUBLICATIONS

Chuang et al., "Physics of optoelectronic devices." (1995): 1-1. 3 pages.

International Search Report and Written Opinon in International Patent Application No. PCT/US2019/053353 dated Dec. 16, 2019, 26 pages.

Kimerling et al., "Monolithic silicon microphotonics." Silicon Photonics. Springer, Berlin, Heidelberg, 2004. 89-120.

Madelung, "Numerical data and functional relationships in science and technology." New series 17 (1982): 571-619.

Nayak et al., "High-mobility p-channel metal-oxide-semiconductor field-effect transistor on strained Si." Applied Physics Letters 62.22 (1993): 2853-2855.

Semiconductor Industry Association. "International Technology Roadmap for Semiconductors 2005 Edition." http:// www. itrs. net/ (2006). 50 pages.

Soref, "The past, present, and future of silicon photonics." IEEE Journal of Selected Topics in Quantum Electronics 12.6 (2006): 1678-1687.

Van De Walle, "Band lineups and deformation potentials in the model-solid theory." Physical Review B 39.3 (1989): 1871. 13 pages.

Walker, "High-speed III-V semiconductor intensity modulators." IEEE Journal of Quantum Electronics 27.3 (1991): 654-667.

Welser et al., "Electron mobility enhancement in strained-Si n-type metal-oxide-semiconductor field-effect transistors." IEEE Electron Device Letters 15.3 (1994): 100-102.

Xu et al., "Micrometre-scale silicon electro-optic modulator." Nature 435.7040 (2005): 325. 3 pages.

\* cited by examiner

STRAINED GERMANIUM SILICON OPTICAL MODULATOR ARRAY INCLUDING STRESS MATERIALS

CROSS-REFERENCE TO RELATED APPLICATIONS

This applications claims priority to U.S. Provisional Application No. 62/737,374 titled "Strained Germanium Silicon Modulators Array for Integrated High-Speed Broadband Modulation," filed Sep. 27, 2018, the entire disclosure of which is incorporated herein by reference.

BACKGROUND

Silicon (Si)-based integrated electronic and photonic circuits serve as a promising platform for telecommunications and integrated micro-photonics. Complementary metal oxide semiconductor (CMOS) compatible photonic modulators with high operation frequency and suitable operation wavelength range are playing an important role in generating binary 0/1 signals at a fast and reliable rate for the realization of a fully integrated electronic and photonics system. Most Si modulators employ a Si refractive index change via free carrier injection. For example, phase-shift modulators using Mach-Zehnder or ring resonator structures have been demonstrated. Unfortunately, the performance of Si phase-shift modulators is limited by carrier recombination during free carrier injection. Si phase-shift modulators also have relatively high power consumption and large device footprints.

Group III-V semiconductor electro-absorption modulators via direct-band materials' Franz-Keldysh effect have also been demonstrated. However, their CMOS incompatibility makes it challenging to make group III-V electro-absorption modulators directly on integrated Si platforms.

Epitaxially grown germanium (Ge) and GeSi on Si substrates are suitable for integrated modulator applications because of their Si CMOS compatibility and distinctive optoelectronic properties. A GeSi electro-absorption modulator employs the Franz-Keldysh effect, similar to group III-V direct band modulators. Applied electric field shifts the modulator material's direct band edge and increases its absorption coefficient. The light intensity passing through the modulator, therefore, can be controlled by the electric field applied across the modulator material. The as-grown epitaxial Ge thin films on Si substrate have an intrinsic tensile strain of ~0.2% due to the thermal expansion coefficient difference between the Ge epitaxial film and the Si substrate. That strain shifts the GeSi modulator's operation wavelength to 1600 nm.

A modulator's operating wavelength adjustment and its system integration for broadband modulation are two major challenges for making modulator arrays for telecommunication and integrated Si micro-photonics. In the case of a phase-shift modulator, the modulator's operating wavelength can be adjusted by changing the coupling gap between the ring resonator and the bus waveguide or by changing the dimensions of the ring structure. In the case of an electro-absorption modulator, the optimization of the modulator material for a specific wavelength can be achieved by tuning the material composition or applying a strain into the material. Both approaches aim to optimize the bandgap for a target wavelength.

The conventional strategy of inserting a modulator for a specific wavelength modulation involves specific materials engineering and device fabrication for each individual modulator. In order to make an integrated system with broadband modulation, multiple modulators have to be fabricated individually and assembled onto a chip. Each fabrication step involves a cost of design and processing development. The more modulators integrated for multiple operation wavelengths, the broader the band coverage and the higher optoelectronic data processing capacity. However, using conventional approaches causes a dramatic increase in cost of device fabrication and system integration.

SUMMARY

An integrated optical modulator circuit includes a substrate and a waveguide patterned in the substrate. The circuit also includes an optical modulator coupled to the waveguide, such that the waveguide operates at a first wavelength. The circuit also includes a stressor material in contact with the optical modulator to apply a strain to the optical modulator, such that the waveguide operates at a second wavelength different from the first wavelength.

A method of making an integrated optical modulator circuit includes patterning a waveguide in a substrate and depositing a nonlinear optical material on the waveguide to form an optical modulator coupled to the waveguide, wherein the optical modulator operates at a first wavelength. The method also includes depositing a stressor material in contact with the optical modulator. The method further includes applying, via the stressor material, a strain to the optical modulator, such that the optical modulator operates at a second wavelength different from the first wavelength.

An integrated optical modulator array includes a substrate, a first waveguide patterned in the substrate, and a second waveguide patterned in the substrate. The array also includes a first optical modulator coupled to the first waveguide and having a first width, and a second optical modulator coupled to the second waveguide and having a second width different from the first width. The array also includes a stressor material disposed between the first optical modulator and the second optical modulator to apply a strain to the first optical modulator and to the second optical modulator. The strain causes the first optical modulator to operate at a first wavelength and the second optical modulator to operate at a second wavelength different than the first wavelength.

A method of making an integrated optical modulator array includes depositing nonlinear optical material on a substrate. The method also includes patterning the nonlinear optical material and the substrate to form a first waveguide in the substrate, a second waveguide in the substrate, a first optical modulator coupled to the first waveguide and having a first width, and a second optical modulator coupled to the second waveguide and having a second width. The method also includes depositing a stressor material between the first optical modulator and the second optical modulator. The stressor material applies a strain to the first optical modulator and to the second optical modulator.

An optical communication system includes a substrate and a plurality of waveguides formed on the substrate. The system also includes a plurality of electro-absorption modulators. Each electro-absorption modulator is coupled to a different waveguide of the plurality of waveguides, and has a width that is different from a width of each other electro-absorption modulator of the plurality of electro-absorption modulators. The system also includes a stressor material, disposed between the plurality of electro-absorption modulators to apply a strain to the plurality of electro-absorption modulators. The strain causes each waveguide to operate at a different wavelength that each other waveguide of the plurality of waveguides.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
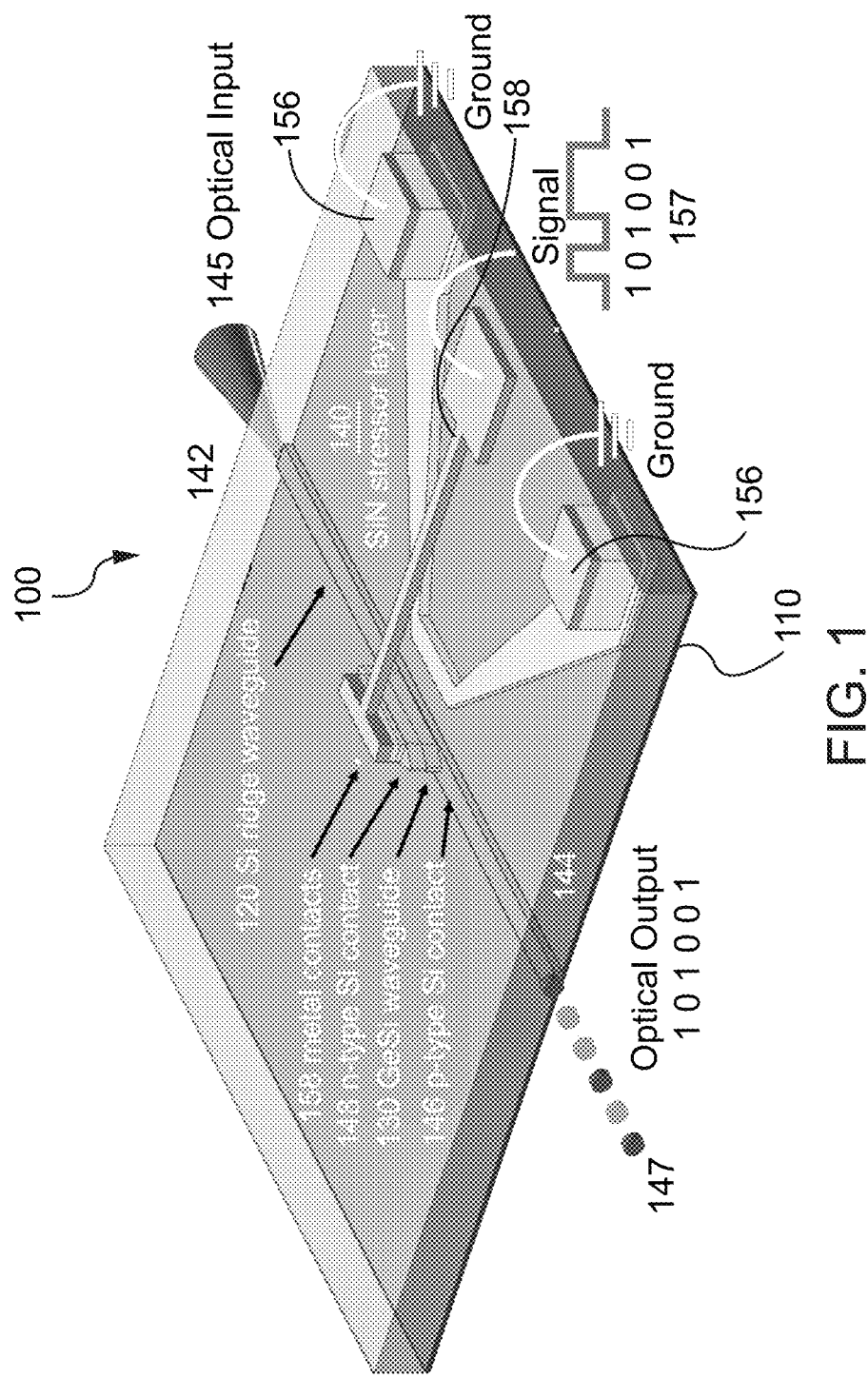
FIG. 1 illustrates an example strained GeSi optical modulator.

As a principle, a stressor layer can be used to apply a homogeneous or inhomogeneous strain to an optical modulator structure. By changing the width of the modulator, the strain in the modulator changes, changing the bandgap and therefore the response wavelength. Optical modulators made of the same material can operate at various wavelengths with the same stressor layer by simply changing in the dimension of the modulators.

A single stressor layer can be used to vary the strain of multiple modulators for broadband modulation in the C- and L-bands for integrated telecommunication. Coupled with changing the modulator material composition, one modulator array could cover the entire O-, C-, and L-telecommunication bands. By including waveguides with various dimensions in a single layer of device fabrication, the modulator array design can be simplified significantly. No individual modulator's material engineering or device bonding is needed for the assembly, since the multiple modulators with different widths and different modulations wavelengths (due to the stressor layer) can be created substantially simultaneously. This is an improvement over conventional approaches, such as epitaxy of distinct materials with different material compositions, which can require that each modulator be fabricated separately prior to bonding (e.g., via wafer bonding and/or transfer printing) with the rest of the assembly.

This approach can be applied to cover wavelength ranges from 1230 nm to 1330 nm (the O-band), from 1530 nm to 1630 nm (the C- and L-bands), or both, in which case the modulator could cover the entire O-, C-, and L-telecommunications bands. Broadband modulation with differential wavelength spacing as narrow as 0.2 nm can be achieved, which makes it suitable for wavelength division and multiplexing integration at a high degree of compactness with a simple device layout, shorter fabrication time, and lower fabrication cost.

Further, multiple wavelength modulators with operational wavelength spacing as narrow as 0.2 nm can be fabricated in a single run, which is suitable for highly integrated dense wavelength division and multiplexing application. All fabrication steps are CMOS-compatible and can be readily employed in a foundry for a commercial-scale, cost-effective production.

Further, any suitable materials, such as any group IV (e.g. GeSn), and group III-V materials (e.g. GaAs, and InGaP) can be employed for optical modulation for, for example, light emitting, photodetection, and sensing devices with waveguide structures correlation between the materials' strain property and other properties of interest. Different light coupling layouts are possible, including evanescent coupling from bus waveguide to modulator waveguide, and direct end-coupling between waveguides.

In summary, such a single, strained GeSi modulator array can cover a broad telecommunication band with multiple modulators designed and fabricated simultaneously in a single lithography and patterning flow. The modulator waveguide dimensions can be designed specifically for target wavelengths. Described in greater detail below are such integrated optical modulator circuits and arrays, as well as optical communication systems employing them.

Strained Germanium Silicon (GeSi) Optical Modulator

FIG. 1 shows an example strained GeSi optical modulator 100. The modulator 100 includes a Si ridge waveguide 120 formed on a substrate 110 with an input 142 and an output 144. A GeSi waveguide 130 is formed on a section of the waveguide 120. The GeSi waveguide 130 is sandwiched between a p-type Si contact 146 and an n-type Si contact 148. The ridge waveguide 120 and contacts 146 and 148 are tapered for higher optical coupling efficiency between the ridge waveguide 120 and the GeSi waveguide 130.

Figure 5:
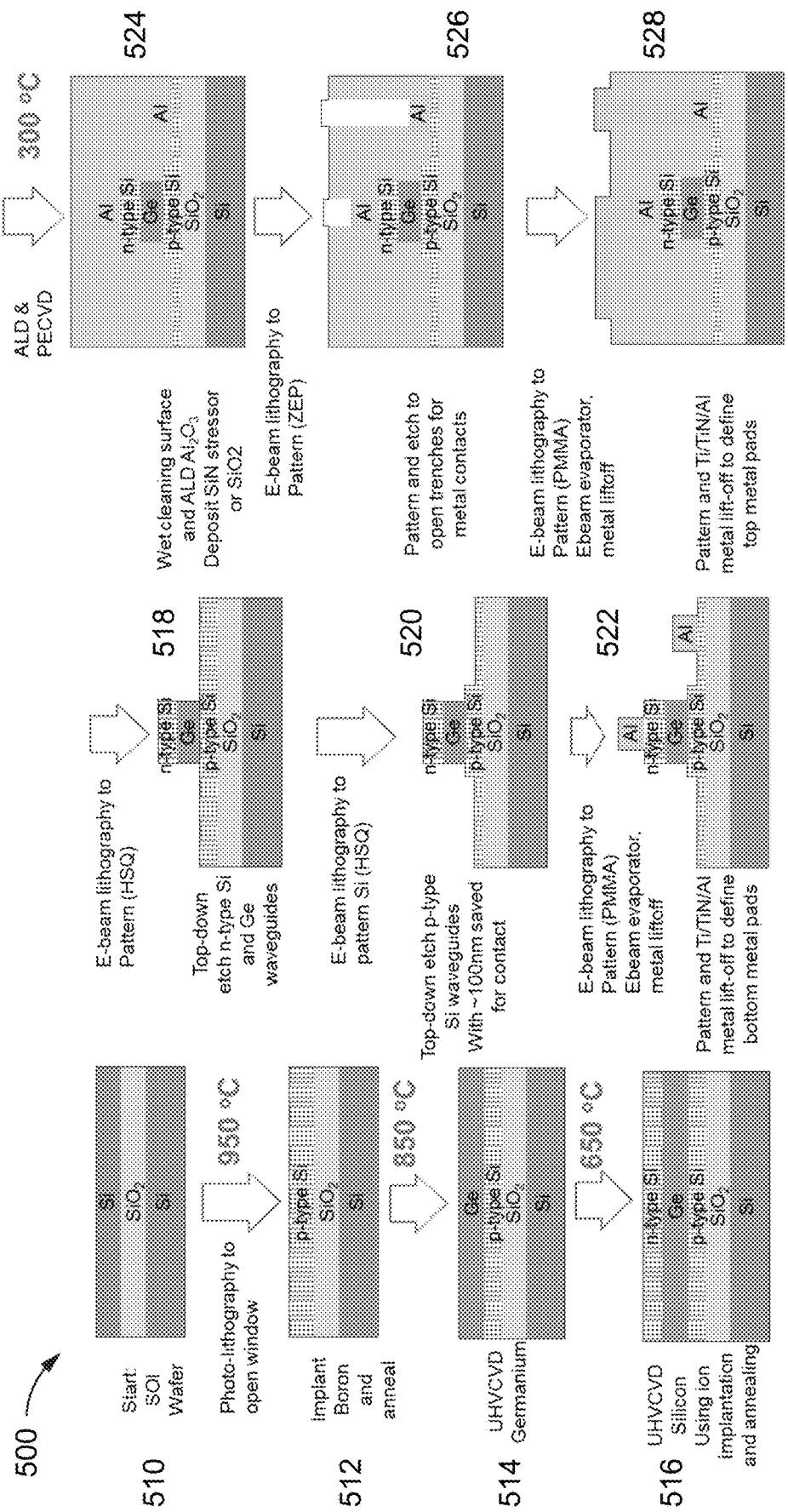
FIG. 5 illustrates an example fabrication flow for an integrated optical modulator array.

As shown in greater detail in FIG. 5, the p-type Si contact 146 can be formed in a section of the Si ridge waveguide 120 and can form the Si portion of the GeSi waveguide 130, with a strip of Ge on top of the p-Si contact 146 to form the GeSi waveguide 130. A thin portion of the p-type Si contact 146 extends out from the GeSi waveguide and is coupled to metal ground electrodes 156. The n-type Si contact 148 is connected to a metal signal electrode 158.

Applying a signal 157 to the n-type Si contact 148 via the metal signal electrode 158 causes the absorption of the GeSi waveguide 130 to change over a particular wavelength or range of wavelengths. This change in absorption modulates the intensity of an input beam 145 propagating through the GeSi waveguide 130, yielding a modulated optical output beam 147 at the output of the Si ridge waveguide 120.

A SiN stressor layer 140 is deposited over the Si ridge waveguide 120, the GeSi waveguide 130, the p-type Si contact 146, and the n-type Si contact 148. The SiN stressor layer 140 strains the GeSi waveguide 130, shifting the wavelength at which it absorbs light when actuated by the electrical signal 157. While described with respect to SiN stressor layers for ease of explanation, any suitable material with a low refractive index and/or low absorption index at or around the wavelength of interest can be used. In this manner the stressor material can minimize or eliminate signal loss, while having sufficient intrinsic stress to cause strain variation in the GeSi modulator. Example stressor materials can include, but are not limited to, SiN, silicon dioxide ($SiO_2$), silicon nitri-oxide (SiON), and aluminum nitride (AlN).

As an explanation for the effect of the stressor material on the optical modulator, and without being bound by any particular theory, a deformation potential theory based on quantum mechanics can be employed to derive effect of strain on band structure of semiconductor materials. An optical modulator's operation wavelength is directly related to its material's bandgap. The strain effect on the fundamental band gap of a diamond structure semiconductor material grown on (100) oriented substrate is expressed as:

$$\Delta E_{v,av} = a_v(\varepsilon_{xx} + \varepsilon_{yy} + \varepsilon_{zz}) \quad (1)$$

$$\Delta E_{c,av} = a_c(\varepsilon_{xx} + \varepsilon_{yy} + \varepsilon_{zz}) \quad (2)$$

$$\delta E_{100} = 2b(\varepsilon_{xx} - \varepsilon_{zz}) \quad (3)$$

$$E_{v,top} = E_{v,av}^0 + \frac{\Delta_0}{3} \quad (4)$$

$$E_{c,btm} = E_{v,top} + E_g \quad (5)$$

$$\Delta E_{v,HH} = \frac{1}{3}\Delta_0 - \frac{1}{2}\delta E_{100} \quad (6)$$

$$\Delta E_{v,LH} = -\frac{1}{6}\Delta_0 + \frac{1}{4}\delta E_{100} + \frac{1}{2}\left[\Delta_0^2 + \Delta_0 \delta E_{100} + \frac{9}{4}(\delta E_{100})^2\right]^{1/2} \quad (7)$$

$$\Delta E_{v,SO} = -\frac{1}{6}\Delta_0 + \frac{1}{4}\delta E_{100} - \frac{1}{2}\left[\Delta_0^2 + \Delta_0 \delta E_{100} + \frac{9}{4}(\delta E_{100})^2\right]^{1/2} \quad (8)$$

where $a_v$ is hydostatic deformation potential for valence band; $a_c$ is hydostatic deformation potential for conduction band; $\varepsilon_{xx}$, $\varepsilon_{yy}$, $\varepsilon_{zz}$ are strains along xx, yy, zz directions; $\Delta_0$ is spin orbit splitting energy; $\delta E_{100}$ is sheer strain deformation potential; b is deformation constant; $\Delta E_{v,HH}$, $\Delta E_{v,LH}$, $\Delta E_{v,SO}$ so are energy band gap variations of heavy hole, light hole, and spin orbit respectively. These parameters are related to the material's composition. Substituting the parameters with numerical values reported in literature for specific semiconductor materials, band gap of the material and its modulation wavelength could be extracted.

Integrated Strained GeSi Optical Modulator Arrays

Figure 2A:
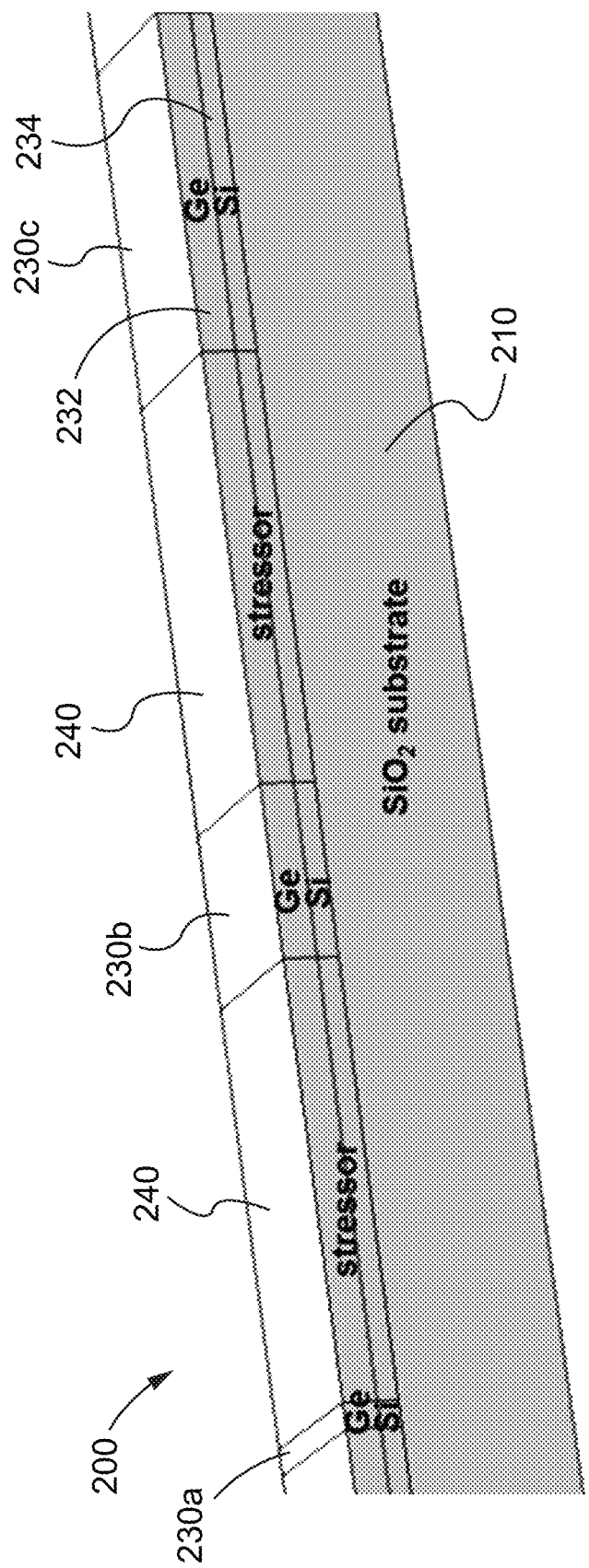
FIG. 2A illustrates a strained GeSi optical modulator array with stressor layers for multi-wavelength modulation.

FIG. 2A illustrates a strained GeSi optical modulator array 200 (the electrodes and electrical contacts are omitted for clarity). The modulator array 200 includes GeSi modulators 240a, 240b, and 240c (collectively, GeSi modulators 240) integrated on the same silicon dioxide substrate 210. Each GeSi modulator 240 includes a Ge waveguide 232 on a Si waveguide 234. The Si waveguides 234 can serve as bus waveguides to carry input light signals into the modulators 230. The signals are coupled evanescently into the Ge waveguides 232 for electro-absorption modulation, then coupled back evanescently into the Si waveguide 234 for further transmission.

The GeSi modulators 230 are electro-absorption modulators that absorb light when modulated with electrical signals. The GeSi modulators 230 can have different widths, e.g., 300 nm for the first GeSi modulator 230a, 2 μm for the second GeSi modulator 230b, and 4 μm for the third GeSi modulator 230c. The GeSi modulators 230 can be arrayed at a constant center-to-center pitch or at a pitch that varies as a function of position. FIG. 2A shows three GeSi modulators 230 at a constant center-to-center pitch, but other modulator arrays may have more or fewer GeSi modulators (e.g., from 3 to 10, or more), including GeSi modulators with different widths and on different center-to-center pitches. The number of GeSi modulators can be selected based on the wavelength separation between the modulators, and/or to cover a desirable wavelength range such as, for example, the entire optical C band.

Stressor material 240, such as $Si_3N_4$, disposed between the GeSi modulators 230 applies strain to the GeSi modulators 230. The GeSi modulators 230 can experience the strain as either a compressive strain or a tensile strain. The applied strain can be a homogeneous strain or an inhomogeneous strain. Each GeSi modulator can experience a different type and/or magnitude of strain.

The strain causes the optical modulators to operate at slightly different wavelengths. For example, the first optical modulator 230a can operate at a first wavelength and the second optical modulator 230a can operate at a different, second wavelength. This occurs because the modulators 230a and 230b have different widths and therefore experience different strains, and/or can also be separated by different amounts of stressor material to modulate the strain experienced by each of the modulators 230a, 230b. Using the first optical modulator 230a as an example and with reference to the discussion of Equations 1-8 above, the different strains change the bandgaps of the first GeSi modulator 230a and the second GeSi modulator 230b by different amounts. This difference in bandgaps causes the first and second GeSi modulators 230a, 230b to absorb light at different wavelengths. The difference between these absorption wavelengths can be at least about 0.2 nm. The shifted absorption wavelengths of the modulators 230 can span part or all of the optical C band (e.g., from about 1530 nm to about 1565 nm, including all values and sub-ranges in between) or the optical L band (e.g., from about 1565 nm to about 1625 nm, including all values and sub-ranges in between).

Figure 2B:
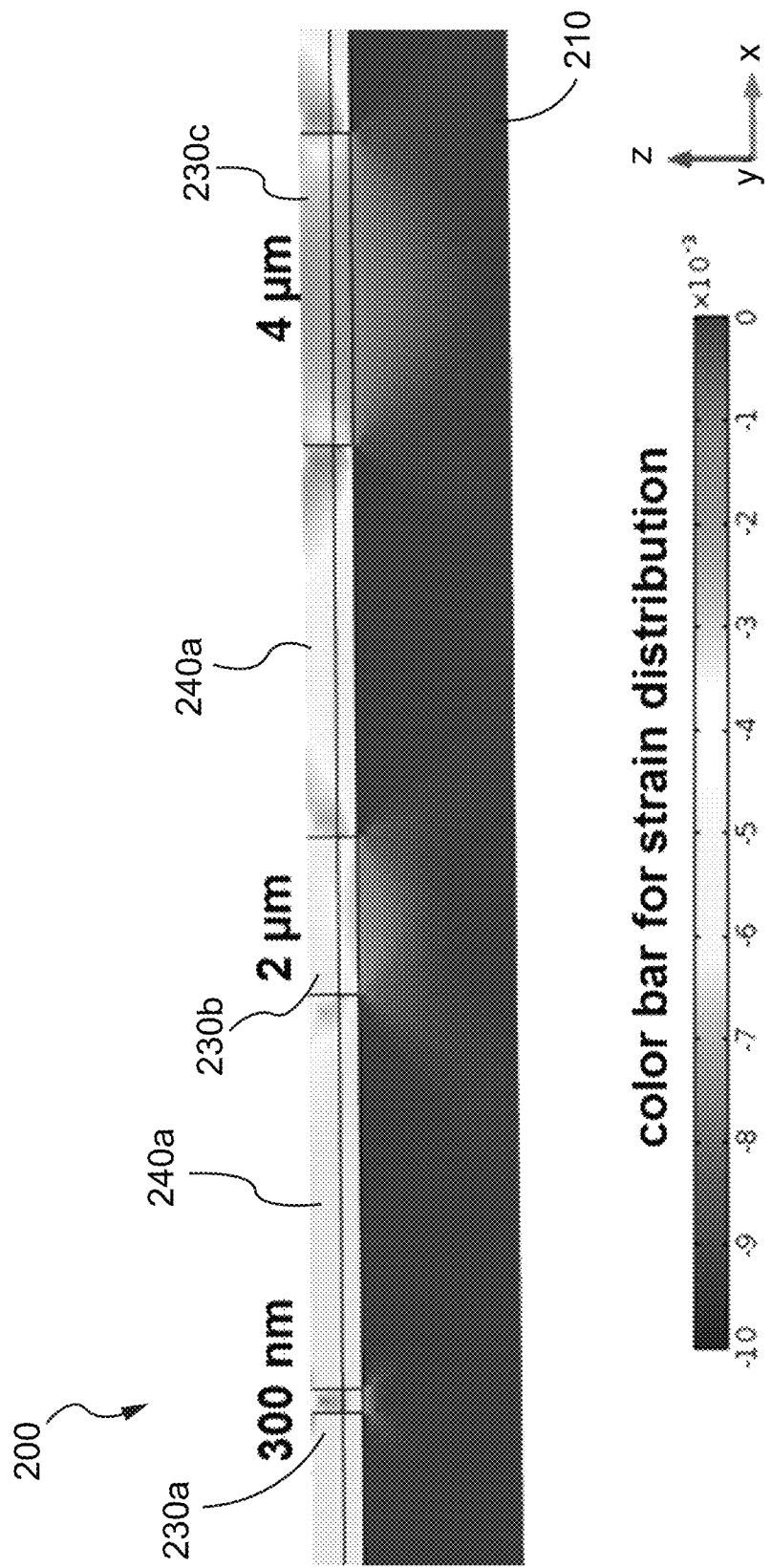
FIG. 2B illustrates simulated strain distribution in the strained GeSi optical modulator array of FIG. 2A.

FIG. 2B shows the compressive strain distribution among the different Ge and Si waveguide modulators 230 modeled with a finite element model. The finite element model is based on experimental results and using real device dimensions for the array 200. The Ge epitaxial film was grown on a Si-on-insulator substrate at a temperature of 730° C., which is consistent with actual fabrication conditions. The waveguide structures of the Ge and Si components were defined by three different waveguide widths for demonstrative purposes. The Ge waveguide modulators have a height of 400 nm and widths of 300 nm, 2μm, and 4μm. The Si waveguide modulators have a height of 250 nm and the same widths as their corresponding coupled Ge waveguide modulators. The Ge and Si waveguide modulators 23a re fabricated in the same process flow including lithography, patterning, and etching.

The stressor layer 240 was deposited in between the Ge/Si waveguide modulators, as illustrated in FIG. 2B, to induce strain into the waveguide modulators 230. Uniform compressive strain of 0.7%, 0.4%, and 0.18% is obtained in waveguides with widths of 300 nm (modulator 230a), 2 μm (modulator 230b), and 4 μm (modulator 230c), respectively. The stressor layer can be any material which has intrinsic stress. A $Si_3N_4$ film with 1 GPa intrinsic compressive stress was used as stressor layer material in this simulation due to its intrinsic stress properties and CMOS compatibility in device fabrication. The simulation is based on solid mechanics theory and accounts for the physical properties of the materials, including $SiO_2$ (substrate), Si (waveguide modulator), Ge (waveguide modulator), and $Si_3N_4$ (stressor material).

Figure 3:
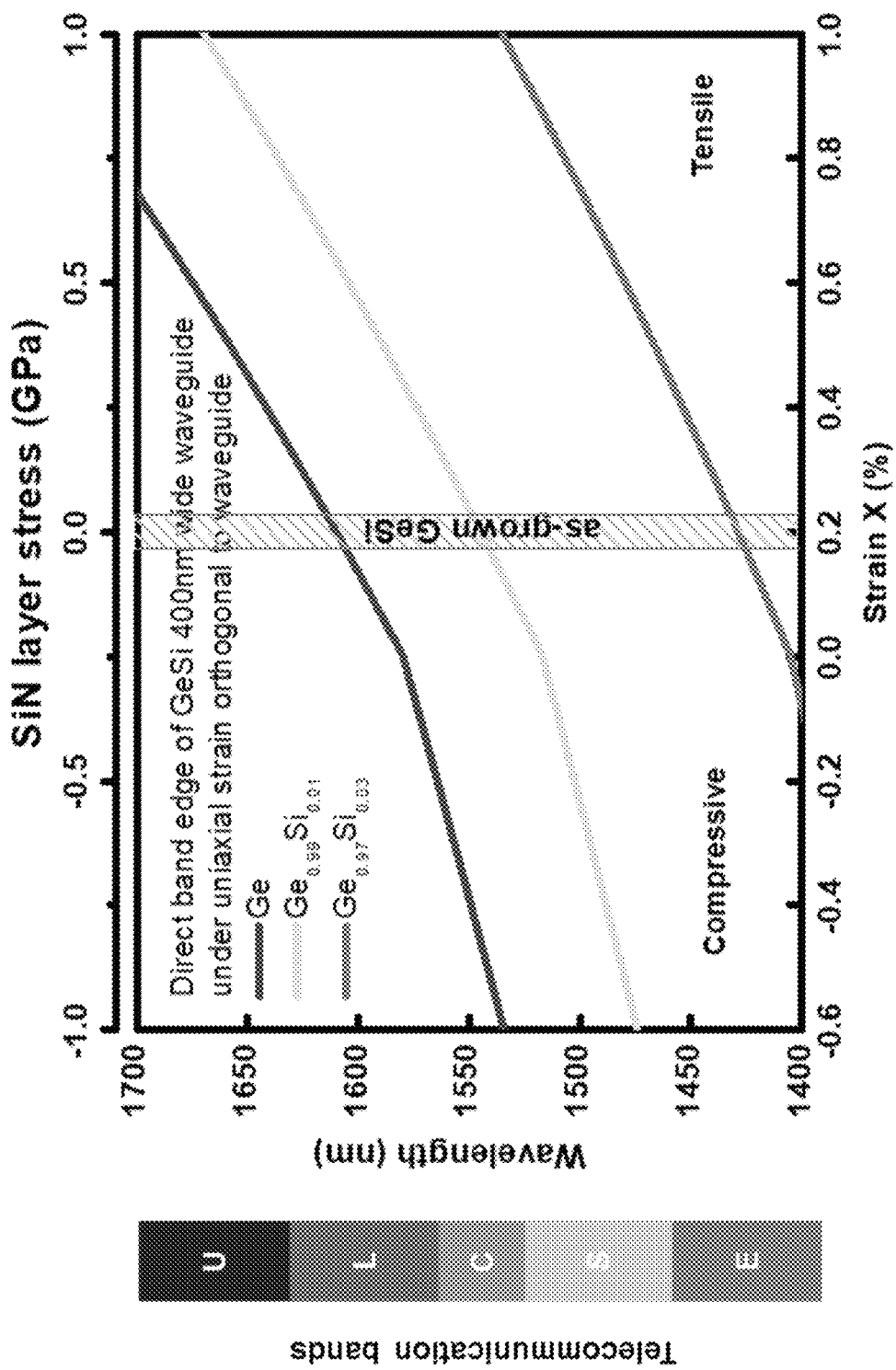
FIG. 3 is a plot of modulation wavelength as a function of strain in a GeSi modulator array with correlations of modulator waveguide dimensions and telecommunication band coverage.

FIG. 3 is a plot of measured optical transmission versus wavelength for GeSi modulators with widths of 400 nm (top curve), 700 nm (upper middle curve), 2 μm (lower middle curve), and 4 μm (bottom curve). The GeSi modulators are under a 1 GPa compressive strain applied by a $Si_3N_4$ film. The compressive strain causes each GeSi modulator reach peak transmission (and peak absorption) at a different wavelength.

The measured absorption edges are 1520 nm, 1525 nm, 1540 nm, and 1564 nm for GeSi modulator waveguide widths of 400 nm, 700 nm, 2000 nm, and 4000 nm, respectively. This measured data is consistent with the simulated strain effects and its modulation wavelengths for the GeSi modulator array. Although FIG. 3 shows the broad bandwidth modulation of the Ge on Si modulator under a 1 GPa compressive $Si_3N_4$ stressor, the strain effects and modulation wavelength broadening also works on a GeSi modulator with various GeSi compositions under various tensile and/or compressive stressor conditions.

Figure 4:
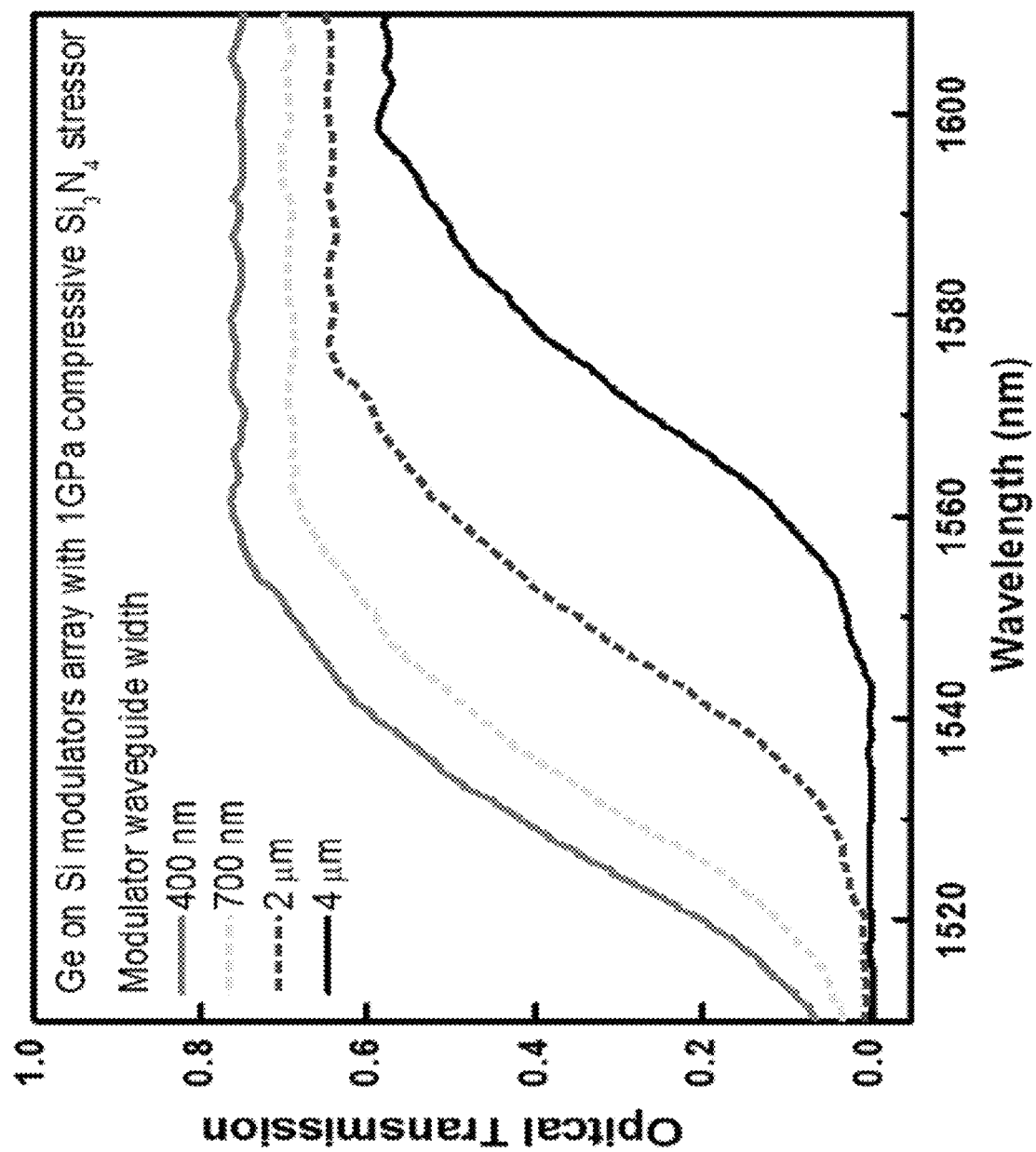
FIG. 4 is a plot of measured optical transmission data of a Ge on Si modulator array with a $Si_3N_4$ film with 1 GPa intrinsic compressive stress as a function of modulator waveguide width.

FIG. 4 shows a correlation of the GeSi optical modulator strain distribution with modulation wavelength. Specifically, the plot of FIG. 4 shows the measured optical transmission for different modulators widths on the same chip/substrate with the same 1 GPa compressive stressor layer. The transition from low transmission of 0 to high transmission of 0.7 on each curve indicates the band-edge, i.e., is indicative of the modulation wavelength. The shift of these curves for the samples with different widths is indicative of the change of the modulation wavelength as a function of the waveguide width without additional processing or manipulation of the modulators. As an example, the modulation wavelength of a Ge modulator that has good/acceptable modulation at the optical L-band (where its band edge can be located) can be shortened by use of a compressive-strained SiN stressor to achieve both optical C- and L-band operation.

In FIG. 4 here, the modulator waveguide array with waveguide modulator widths of 300 nm, 2 μm, and 4 μm is capable of electro-absorption modulation at telecommunication wavelengths of 1530 nm, 1550 nm, and 1570 nm, respectively.

Making an Integrated Strained GeSi Optical Modulator Array

An example fabrication procedure for making an integrated optical modulator circuit can proceed as shown in FIG. 5. The starting point can be a silicon layer on an insulator wafer (step 510), and controlled boron implantation (step 512) can be done on the patterned Si layer to create a p-type Si layer that becomes the Si portion of the GeSi modulator and serves as the ground contact. Next, a Ge layer is grown epitaxially on the p-type Si layer (step 514), followed by poly-Si layer growth on the resulting GeSi layer. Then, phosphorus ion implantation is conducted with thermal annealing to make an n-type Si layer on top of the GeSi layers (step 516). GeSi waveguides with various dimensions are patterned and etched (steps 518, 520, and 522). A $Si_3N_4$ stressor layer is then deposited using multi-frequency plasma enhanced chemical vapor deposition followed by planarization (step 524). Then, trenches are opened and/or created for metal contacts (step 526), which are created at step 528. The fabrication steps are CMOS-compatible and readily to be applied to foundry fabrication. Multiple waveguides can be simultaneously fabricated on the same substrate in this manner to create an integrated strained modulator array.

Figure 6:
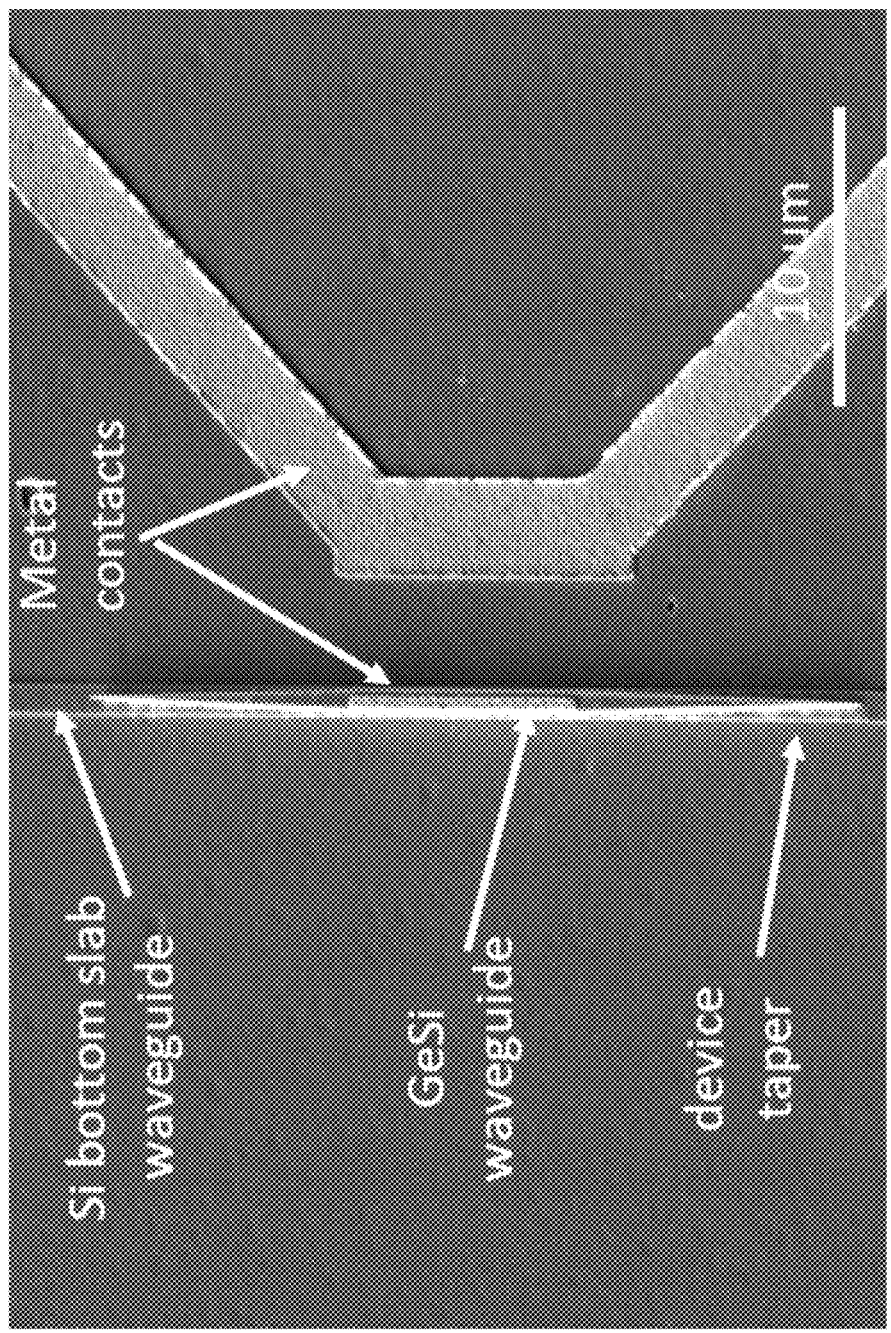
FIG. 6 is a scanning electron microscopic image of an example GeSi optical modulator circuit.

FIG. 6 is a scanning electron microscope image of a strained GeSi modulator fabricated using the process 500 shown in FIG. 5. The modulator's absorption edge shifts (as measured by optical transmission) as a function of the modulator waveguide width under the same $Si_3N_4$ stressor layer, as shown in the FIG. 6. The various optical transmission curves with various GeSi modulator widths correspond to a wide strain effect on the GeSi modulator in order to achieve a wide modulation bandwidth.

Optical Communication Systems With Strained GeSi Modulator Arrays

Broadband modulation with a strained GeSi modulator array using this modulator fabrication procedure is demonstrated in both the C- and L-band telecommunications ranges. Input light signals with wavelength spacings of 20 nm from 1530 nm to 1570 nm can be modulated simultaneously by this array, which largely enhanced the optoelectronic data processing capacity compared to a single channel modulator.

The integrated optical modulator array can be a component of an optical communication system that is useful for such broadband modulation.

Figure 7:
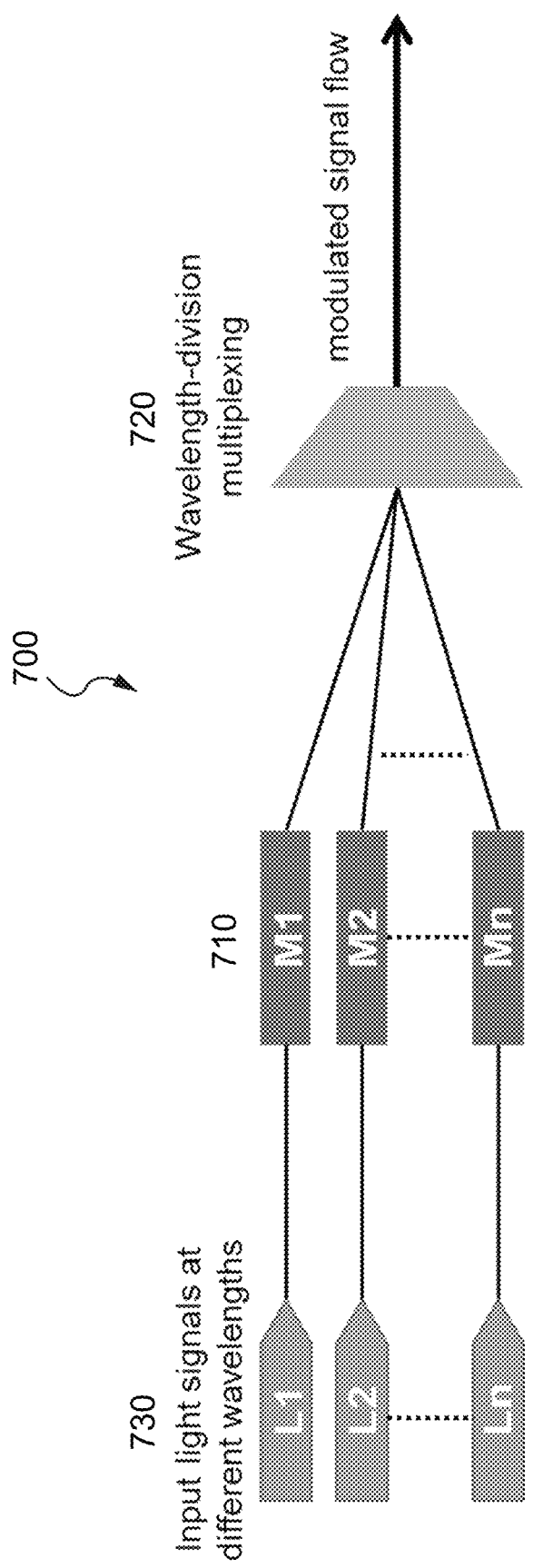
FIG. 7 shows a wavelength division and multiplexing system for broadband modulation with an integrated strained GeSi optical modulator array.

FIG. 7 shows an example of an optical communication system 700 with a strained GeSi modulator array. The system 700 includes an integrated strained GeSi modulator array 710, which can be structurally and/or functionally similar to the array 200 shown in FIGS. 2A and 2B. Explained with reference to the array 200, each of the "modules" M1, M2 . . . Mn in FIG. 7 can correspond to a single integrated optical modulator circuit formed on a substrate of the array 200, or across multiple arrays (not shown). Accordingly, the system 700 includes (e.g., on the array 710 or across multiple arrays) the substrate 210 and the modulators 230 formed on the substrate 210. Further, each electro-absorption modulator 230 can have a different width and different operating wavelength. The stressor material 740 is disposed between the electro-absorption modulators and applies a strain to them, which causes each waveguide to operate at a different wavelength as explained above.

As also shown in FIG. 7, the system 700 can also include a multiplexer circuit 720 (illustrated here as performing wavelength-division multiplexing) that receives the optical output from each waveguide of the array(s) 710 and generates a modulated signal. FIG. 7 also illustrates that multiple light signals (collectively referenced as 730), from one or multiple sources, can be coupled into the optical inputs of the waveguides of the array 710.

As illustrated in FIG. 7, more modulation channels with a finer operating wavelength variation among waveguide modulators can be achieved by increasing the number of waveguides and reducing the variation in width between waveguides. Optical modulation covering entire C- and L-bands with wavelength spacing of 0.2 nm is possible by utilizing this approach. Not useful only for C- and L-bands, this modulator array can be transformed for O-band (e.g., wavelength range from about 1260 nm to about 1360 nm) operation. In order to do that, the Si concentration can be increased for a suitable GeSi composition to have a modulation wavelength of about 1360 nm. A stressor layer/material and layout like those described above can be applied to the GeSi composition to introduce strains for 1260 nm to 1360 nm multiple-wavelength modulation. This increases the data processing capacity and reduces the total system cost in telecommunication and datacenter applications.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An integrated optical modulator array, comprising:
a substrate;

a first waveguide patterned in the substrate;
a second waveguide patterned in the substrate;
a first optical modulator coupled to the first waveguide and having a first width;
a second optical modulator coupled to the second waveguide and having a second width different from the first width;
a stressor material disposed between the first optical modulator and the second optical modulator to apply a strain to the first optical modulator and to the second optical modulator,
wherein the strain experienced by the second optical modulator is different from the strain experienced by the first optical modulator due to the second width being different from the first width, the strain experienced by the first optical modulator causing the first optical modulator to operate at a first wavelength and the strain experienced by the second optical modulator causing the second optical modulator to operate at a second wavelength different than the first wavelength.

2. The integrated optical modulator array of claim 1, wherein the first optical modulator and the second optical modulator are both electro-absorption modulators.

3. The integrated optical modulator array of claim 1, wherein the first optical modulator experiences the strain as a compressive strain.

4. The integrated optical modulator array of claim 1, wherein the first optical modulator experiences the strain as a tensile strain.

5. The optical communication system of claim 1, wherein the strain is a homogeneous strain.

6. The electro-absorption modulator array of claim 1, wherein the strain is an inhomogeneous strain.

7. The integrated optical modulator array of claim 1, wherein the strain causes a) the first waveguide to operate at the first wavelength by changing a band gap of the first optical modulator by a first amount, and b) the second waveguide to operate at the second wavelength by changing a band gap of the second optical modulator by a second amount different than the first amount.

8. The integrated optical modulator array of claim 1, wherein the first wavelength is at least about 0.2 nm greater than the second wavelength.

9. The integrated optical modulator array of claim 1, wherein the first wavelength and the second wavelength are in the optical C band.

10. The integrated optical modulator array of claim 1, wherein the first wavelength and the second wavelength are in the optical L band.

11. The integrated optical modulator array of claim 1, wherein the first wavelength and the second wavelength are each between about 1530 nm to about 1565 nm.

12. The integrated optical modulator array of claim 1, wherein the first wavelength and the second wavelength are each between about 1565 nm to about 1625 nm.

13. The integrated optical modulator array of claim 1, wherein the first waveguide and the second waveguide are composed of different materials, and wherein the first optical modulator and the second optical modulator are composed of the same material.

14. A method of making an integrated optical modulator array, the method comprising:
depositing nonlinear optical material on a substrate;
patterning the nonlinear optical material and the substrate to form:
 a first waveguide in the substrate;
 a second waveguide in the substrate;
 a first optical modulator coupled to the first waveguide and having a first width; and
 a second optical modulator coupled to the second waveguide and having a second width; and
depositing a stressor material between the first optical modulator and the second optical modulator, the stressor material applying a strain to the first optical modulator and to the second optical modulator,
wherein the strain experienced by the second optical modulator is different from the strain experienced by the first optical modulator due to the second width being different from the first width, the strain experienced by the first optical modulator causing the first optical modulator to operate at a first wavelength and the strain experienced by the second optical modulator causing the second optical modulator to operate at a second wavelength different than the first wavelength.

15. The method of claim 14, wherein the depositing the nonlinear optical material comprises forming a layer of at least one of a group IV material or a group III-V material.

16. The method of claim 14, wherein the depositing the nonlinear optical material comprises forming a layer of at least one of germanium (Ge), germanium-silicon (GeSi), gallium-arsenide (GaAs), or indium-phosphorus (InP).

17. The method of claim 14, wherein the substrate comprises a first silicon layer on an oxide layer, and further comprising, before depositing the nonlinear optical material:
doping the first silicon layer, and
wherein depositing the nonlinear optical material comprises forming a germanium layer on the first silicon layer.

18. The method of claim 17, further comprising,
forming a second silicon layer on the germanium layer, and
wherein patterning the nonlinear optical material comprises patterning the second silicon layer, the germanium layer, and the first silicon layer.

19. The method of claim 14, further comprising, before depositing the stressor material:
forming an adhesion layer on the optical modulators, the adhesion layer causing the stressor material to adhere to the optical modulators.

20. The method of claim 14, further comprising:
forming a pair of electrical contacts in electrical communication with the first optical modulator.

21. An optical communication system, comprising:
a substrate;
a plurality of waveguides formed on the substrate;
a plurality of electro-absorption modulators, wherein each electro-absorption modulator of the plurality of electro-absorption modulators:
 is coupled to a different waveguide of the plurality of waveguides; and
 has a width that is different from a width of each other electro-absorption modulator of the plurality of electro-absorption modulators; and
a stressor material, disposed between the plurality of electro-absorption modulators to apply a strain to the plurality of electro-absorption modulators, the strain causing each waveguide to operate at a different wavelength that each other waveguide of the plurality of waveguides.

22. The optical communication system of claim 21, further comprising a multiplexer coupled to each waveguide of the plurality of waveguides.

* * * * *